United States Patent [19]

Teacherson

[11] 4,359,758
[45] Nov. 16, 1982

[54] HOLOGRAPHIC TELEVISION

[76] Inventor: George Teacherson, P.O. Box 762, Palm Beach, Fla. 33480

[21] Appl. No.: 27,303

[22] Filed: Apr. 5, 1979

[51] Int. Cl.³ .................... H04N 9/54; G03H 1/22
[52] U.S. Cl. .................... 358/90; 350/3.85; 313/477 R; 313/478
[58] Field of Search .............. 358/2, 90, 237; 350/3.85, 3.86; 313/477 R, 478

[56] References Cited

U.S. PATENT DOCUMENTS

| | | | |
|---|---|---|---|
| 2,438,256 | 3/1948 | Stein | 358/237 |
| 3,046,329 | 7/1962 | Reesor | 358/144 |
| 3,490,827 | 1/1970 | Van Ligten et al. | 350/3.85 |
| 3,544,711 | 12/1970 | DeBitetto | 358/90 |
| 3,548,093 | 12/1970 | Kock | 178/6.5 |
| 3,632,181 | 1/1972 | Lee | 350/3.85 |
| 3,991,486 | 11/1976 | Derderian et al. | 350/3.85 |

FOREIGN PATENT DOCUMENTS 961663  5/1950  France .

OTHER PUBLICATIONS

Kaye, "Liquid Crystals: Material with a Hot Future", *Electronic Design*, vol. 19, Sep. 13, 1970, pp. 76–81.

*Primary Examiner*—John C. Martin
*Attorney, Agent, or Firm*—George A. Teacherson

[57] ABSTRACT

A holographic television system is disclosed which is capable of generating, transmitting and reconstructing three-dimensional moving pictures in real time and in color while using no more electromagnetic bandwidth for transmission than required by present-day black and white television signals.

3 Claims, 5 Drawing Figures

HOLOGRAPHIC TELEVISION

BACKGROUND OF THE INVENTION

This invention relates to three-dimensional television systems and more particularly to those systems in which the three-dimensional pictures are produced, transmitted, received and displayed electronically without the intermediate use of mechanical and film devices.

Shortcomings of the prior art systems have appeared in the extreme complexity and highly sophisticated electronic machinery that they required. Other systems exhibited a need to record the images on film, even for instant playback. Still other systems have required dual lasers or twin, dual-frequency energy sources. Some have even required colored glasses in order to see color reproductions. Or they were only capable of recording different colors sequentially, thereby making realtime televising of the color holographic pictures impractical. And naturally, a major shortcoming of any system designed for use in a home three-dimensional television system is multi, discrete "boxes" instead of one, single, self-contained "box" which instantly and in real time produces the desired, televised images.

Accordingly, a primary object of the instant invention is to provide a simple, but effective real-time holographic television system using no more electromagnetic bandwidth for transmission than required for present-day two-dimensional systems.

Another object of the instant invention is to provide for digital generation of the pictures.

A further object of the instant invention is to provide for a complete home holographic receiver in a single cabinet.

A still further object of the instant invention is to provide for a plurality of differing methods and apparati for receiving three-dimensional pictures in the home.

A still further object of the instant invention is to provide for the transmission and electromagnetic reception of color as well as monochromatic three-dimensional moving pictures.

SUMMARY OF THE INVENTION

The invention comprises means to establish, transmit through electromagnetic radiation, receive and reconstruct the transmitted, three-dimensional real time moving pictures in real time without the use of film or mechanical intermediate means. For "black and white" transmission, a single, monochromatic coherent visible light source is required in a simple set-up in conjunction with a single lens for magnification. For single-color reception a single, complementary light source and a single magnifying lens is required in conjunction with a suitable electromagnetic signal processor for visible reconstruction of the transmitted holographic signal. For color systems, the addition of coherent light sources, each of a primary color, is all which is required. The electromagnetic bandwidth required for transmission does not necessarily change.

BRIEF DESCRIPTION OF THE DRAWING

The invention will now be particularly described, merely by way of example, so that other objects, features and advantages of the invention, its organization, construction and operation will be best understood from the following detailed description taken in conjunction with the several figures of the accompanying drawing in which.

Figure three schematically shows a digital receiver.

DESCRIPTION OF THE PREFERRED EMBODIMENTS

Figure 1:
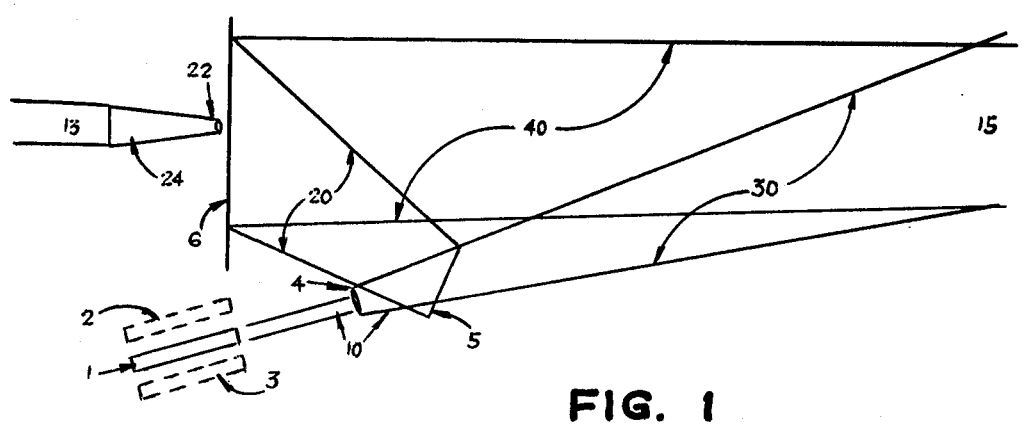
FIG. 1 shows schematically the transmitting portion of the instant real time, three-dimensional, holographic television system.

Referring to the figures of the drawing wherein like numerals correspond to like elements, FIG. 1 shows the "studio" section of the transmitting end of the instant invention in schematic. The camera can be a standard black and white television camera having a standard vidicon or image-orthicon tube. This is not to say that a Charge-Coupled Device or other type imaging means 13 with or without a lens cannot be used in the system. Any suitable imaging means 13 can be used. The instant system is designed to use standard television electronics. Three-dimensional, real time images are presented to the electronics through the novel system here described. For simplicity, we will discuss a monochromatic, "black and white"-type holographic television system.

Laser 1 casts a coherent beam of light 10 through beam spreader (BS) 4. The resultant, wide-angled beam passes through beam splitter (BT) 5. At BT 5 a portion of beam 10 is reflected directly to a contrast-modulatable screen 6 as a reference beam 20. The remaining portion of the spread beam 10 passes through BT 5 as scene-illuminating beam 30. Beam 30 then strikes scene 15. The light from beam 30 then reflects off scene 15 and becomes reflected and modulated beam 40. Beam 40 travels back to screen 6 carrying the holographic information needed to interfere with reference beam 20 and thereby produce light and dark interference fringes which can ultimately be used to reproduce in three-dimensional realism images of the originally illuminated scene 15. Beam 20 and beam 40 interfere with each other and produce interference fringes (not shown) on screen 6. The interference pattern formed on screen 6 contains all the information needed to reconstruct the original three-dimensional scene 15 in three dimensions. However, this pattern contains far too much detail and individual pieces of holographic "information" to transmit through the standard television systems electronics.

Since every "piece" of a hologram contains all the information required to reproduce the entire scene, it is possible to reduce the amount of "information" to be transmitted by transmitting only a small portion of the holographic interference pattern.

The instant invention accomplishes this task of reducing the amount of holographic information to be transmitted through the use of one magnifying lens 22 set in isolation cone 24. Cone 24 serves two functions. It first holds lens 22 away from camera imaging means 13 a distance equivalent to its focal length such that the magnified interference pattern section comes to a focus on camera imaging section 13. It, secondly, can be made opaque to block out all light except that which is emanating from lens 22.

Hence, three-dimensional, moving pictures can be transmitted in real time through the use of standard black and white television systems over a black and white electromagnetic bandwidth. Naturally, a color bandwidth (or one of any size) can be used to transmit even more detailed information if desired.

Color, real-time, moving holograms can be transmitted through the addition of two additional lasers 2 and 3 (shown in phantom in FIG. 1). If lasers 1, 2 and 3 each produce light of a primary color, i.e.: red, green and blue, the resulting interference pattern on screen 6 contains all the information needed to reconstruct color, moving holograms at the receiving end in real time. No other equipment must be added and the bandwidth can remain the same size. Hence, it is seen that color holograms can be transmitted using the same electromagnetic bandwidth as required for mono-chromatic holograms, and that they can be produced by the addition of no more equipment than two extra lasers.

Figure 2A:
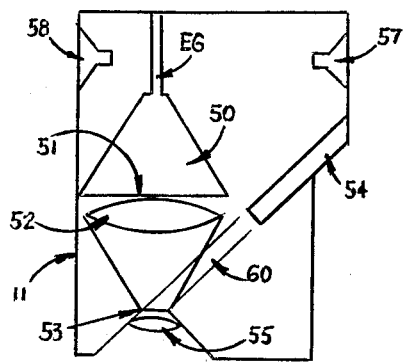
FIGS. 2A–C schematically shows three different apparati for the receiving end of the system in its designated three parts.

Turning to the receiving end of the instant system, the various parts of FIG. 2 show a number of different design for a home holographic television receiver. Each scheme is designed to fit efficiently into a cabinet 11 without the need for extraneous, non-connected pieces. As in present-day television sets, a single cabinet 11 can serve the purpose.

As before, the standard television electronics can be equivalent to that being used today. The electronics feed a cathode ray tube (CRT) 50 which paints the transmitted interference pattern on its phosphorescent screen 51. This pattern (not shown) passes through image reducing lens 52 which focusses the pattern on reconstructing plate 53 where laser 54 shines through the light and dark, reconstructed fringes thereby reconstructing the originally-transmitted, moving holograms in real time. The reconstructed, moving holograms then pass through magnifying lens 55. The images hologram form can be magnified to any size where comfortable viewing is possible. Since a viewer is looking at magnified three-dimensional images, a viewing screen is not necessary. Indeed, such a screen may actually reduce the quality of the reconstructed holograms to simple, two-dimensional, flat pictures. Naturally, if desired, a viewing screen (not shown) can be placed in between lens 55 and the viewer (not shown).

Image reducing lens 52 is used to reduce the reconstructed fringes to the same size as those which were originally formed. This brings the formerly magnified fringes back to the size where they closely approximate those originally transmitted. Simply, they closely match those formed by the original wavelength and should better reconstruct the images by means of the matching, reconstructing wavelengths.

Of course, lens 52 may not be needed if the laser beam 60 can be spread to the size required to fully illuminate the interference pattern images produced by CRT 50. It may be found, however, that some definition is lost by using an expanded beam rather than illuminating a pattern of equivalent size to that transmitted.

Housing 11 completely encloses the works including audio speaker 57 and leaves laser 54 available for easy servicing. Addition of speaker 58 provides for stereophonic sound to correspond to the three-dimensional image being projected. Nothing in this invention prevents the inclusion of a hi-fi sound system to cooperate with the displayed holographic images.

Figure 2B:
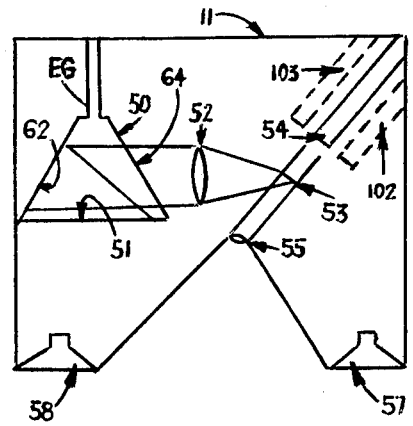
Figure 2C:
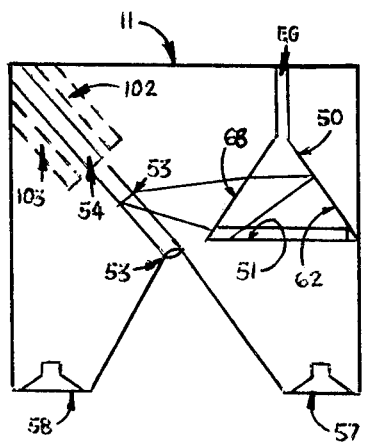

FIGS. 2b and 2c show other methods for producing a three-dimensional, real time, moving image after the manner of the instant invention. In these two embodiments, full silvered mirror 62 reflects the interference pattern produced by phosphorescent screen 51 and passes it through clear section 64 of CRT 50, through image reducing lens 52 and onto reconstructing plate 53. Laser 54 shines through plate 53 and the pattern produced thereon. The reconstructed holographic image is magnified by lens 55 and directly presented for viewing. Housing 11 provides space for speakers 57 and 58 beside the image and in front of the cabinet in both cases.

FIG. 2c shows image reducing fresnel lens 68, made integral with CRT 50 clear section 64, replacing image reducing lens 52.

Figure 3:
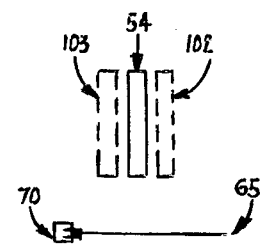

CRT 50 is, of course, not the limiting image production device for the interference pattern produced by the instant invention. FIG. 3 is an extremely simple schematic of how three-dimensional, moving images can be directly produced digitally without intermediate steps. Laser 54 shines through a matrix array 65 of liquid crystal (LC) devices. Digital bus 70 feeds the multiplexed array 65. Each individual LC bit is capable of transforming between the states of being clear and opaque, in response to an applied electrical signal. Note that holographic wave reconstruction techniques, pattern contrast plays no part in the tonal qualities of the reconstructed three-dimensional scene. Hence, extremely high-constrast plates (i.e.: those registering either transparent or opaque with no middle ground) reproduce scenes perfectly. Thus, dual-state LC's can be used to good advantage here.

Matrix array 65 comprises a series of rows of horizontal LC bits stacked vertically. Digital bus 70 feeds each horizontal line of LC bits through a multiplexed lead. Scanning is accomplished digitally, without the use of an electron gun (EG) as shown in FIG. 2. Digital transmission can be accomplished by using a charge-coupled device (CCD) (not shown) as the "camera" imaging means 13. In this case, the CCD feeds a digital microprocessor which encodes the interference pattern as a series of digital pulses. On the receiving end, digital bu 70 feeds each pulse serially to each LC bit in array 65. Laser 54 shines through array 65 which reproduces the changing interference pattern in real time, thereby producing real time, three-dimensional pictures.

It should be noted that digital encoding, transmission (i.e.: a series of digital bits) and decoding of even color, holographic television should require a minute amount of electromagnetic bandwidth for the serial transmission.

Naturally, as stated before, multiple lasers can be used to obtain holographic color pictures without an increase in bandwidth. As shown in phantom, addition to the system of lasers 2 and 3 on the transmitting end and 102 and 103 on the receiving end—transmitting and receiving lasers being chromatically equivalent and of primary colors, with equivalent relative placement spatially—will produce color holograms.

It will be understood that variations could be made on the embodiment described without departing from the essential features of the invention and the preferred embodiments are not intended to limit the spirit or scope of the invention as set forth in the appended claims, thus:

I claim:

1. A three-dimensional (3D) television (TV) picture receiving system including cabinet, said single cabinet adapted to completely house said receiving system comprising:
  an image producing device for producing an electronically received image;

means for mounting said image producing device within said cabinet;

said image producing device being a cathode ray tube (CRT);

said CRT having a full-silvered, light reflecting side internal of said tube and a light transparent side opposite to said full-silvered side for transmitting said produced image off to the side of said CRT while retaining said image within the confines of said cabinet, said cabinet adapted to mount said CRT off to one side of the other components mounted therewithin;

a reconstructing plate mounted within said cabinet for display of the image produced by said CRT;

means for mounting said reconstructing plate internal to the said cabinet;

at least one device for producing coherent light;

means for mounting therewithin said cabinet said light device;

one said mounting means for each said light device;

said mounting means adapted to allow said components to shine said coherent light upon said image being displayed upon with reconstructing plate;

magnifying lens for externally presenting said internally received and reconstructed 3D TV picture to a viewer;

means for mounting said lens to perform said function;

a minimum of one audio speaker to provide sound simultaneously to the picture; and means for mounting said speaker, one means for each speaker extant, to allow said speaker to perform said function.

2. The 3D TV system of claim 1 wherein an image reducing lens is mounted within said cabinet for the purpose of reducing the spatial size of said produced image before displaying same on said reconstructing plate.

3. The system of claim 2 wherein is mounted a CRT having an image-reducing fresnel lens made integral to said transparent side for eliminating the need for a separate image reducing lens mount within said cabinet.

* * * * *